United States Patent
Kurihara (10) Patent No.: US 9,854,652 B2
(45) Date of Patent: Dec. 26, 2017

(54) LIGHTING APPARATUS AND LIGHTING SYSTEM

(71) Applicant: Panasonic Intellectual Property Management Co., Ltd., Osaka (JP)

(72) Inventor: Shinichiro Kurihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/404,333

(22) Filed: Jan. 12, 2017

(65) Prior Publication Data

US 2017/0208671 A1     Jul. 20, 2017

(30) Foreign Application Priority Data

Jan. 15, 2016   (JP) .................................. 2016-006505

(51) Int. Cl.
| | |
|---|---|
| *H05B 37/02* | (2006.01) |
| *G06F 9/445* | (2006.01) |
| *G05B 15/02* | (2006.01) |
| *H05B 33/08* | (2006.01) |
| *F21Y 115/10* | (2016.01) |

(Continued)

(52) U.S. Cl.
CPC ..... *H05B 37/0272* (2013.01); *H05B 33/0845* (2013.01); *F21V 3/02* (2013.01); *F21Y 2115/10* (2016.08); *H04L 67/125* (2013.01)

(58) Field of Classification Search
CPC ......................... H05B 37/0272; H05B 33/0845
See application file for complete search history.

(56) References Cited

U.S. PATENT DOCUMENTS

| | | | |
|---|---|---|---|
| 6,331,756 B1 * | 12/2001 | Belliveau ............. | H04N 9/3141 315/316 |
| 2005/0122921 A1 * | 6/2005 | Seo ....................... | H04W 48/16 370/310 |

(Continued)

FOREIGN PATENT DOCUMENTS

| | | |
|---|---|---|
| JP | 2000-348872 | 12/2000 |
| JP | 2002-260875 | 9/2002 |

(Continued)

*Primary Examiner* — Tung X Le
*Assistant Examiner* — Raymond R Chai
(74) *Attorney, Agent, or Firm* — Renner, Otto, Boisselle & Sklar, LLP (57) ABSTRACT

Lighting apparatuses have a first communication mode in which the lighting apparatuses and a first or second communication terminal mutually transmit and receive a command and a second communication mode in which the lighting apparatuses forming a mesh network mutually transmit and receive the command. Among the lighting apparatuses that receive the command originating from the first communication terminal in the second communication mode, the lighting apparatuses that are not in communication with the second communication terminal in the first communication mode execute the command received in the second communication mode. On the other hand, the lighting apparatus that is in communication with the second communication terminal in the first communication mode maintains a current operating state without executing the command received in the second communication mode.

15 Claims, 7 Drawing Sheets (51) Int. Cl.
*F21V 3/02* (2006.01)
*H04L 29/08* (2006.01)

(56) References Cited

U.S. PATENT DOCUMENTS

| | | | | |
|---|---|---|---|---|
| 2007/0197262 | A1* | 8/2007 | Smith | H04B 3/542 |
| | | | | 455/562.1 |
| 2008/0265799 | A1* | 10/2008 | Sibert | H05B 37/0245 |
| | | | | 315/292 |
| 2013/0293118 | A1* | 11/2013 | Nagashima | H05B 37/0272 |
| | | | | 315/155 |
| 2014/0265881 | A1* | 9/2014 | Karc | H05B 37/0272 |
| | | | | 315/158 |
| 2015/0257240 | A1* | 9/2015 | Matovina | H05B 37/0263 |
| | | | | 315/312 |
| 2016/0353558 | A1* | 12/2016 | Nanahara | H05B 37/0272 |
| 2017/0023811 | A1* | 1/2017 | Zhang | G02F 1/1303 |
| 2017/0188338 | A1* | 6/2017 | Lu | H04W 72/04 |

FOREIGN PATENT DOCUMENTS

| | | |
|---|---|---|
| JP | 2003-229284 | 8/2003 |
| JP | 2003-234197 | 8/2003 |
| JP | 2004-259657 | 9/2004 |
| JP | 2004-311311 | 11/2004 |
| JP | 2005-063859 | 3/2005 |
| JP | 2014-060078 | 4/2014 |

* cited by examiner

LIGHTING APPARATUS AND LIGHTING SYSTEM

CROSS REFERENCE TO RELATED APPLICATION

This application claims the benefit of priority of Japanese Patent Application Number 2016-006505 filed on Jan. 15, 2016, the entire content of which is hereby incorporated by reference.

BACKGROUND

1. Technical Field

The present disclosure relates to lighting apparatuses forming a mesh network, and a lighting system.

2. Description of the Related Art

Conventionally known are lighting systems in which a plurality of lighting apparatuses having a communication function form a mesh network. The mesh network refers to a network in which a plurality of appliances construct a wireless communication channel among one another.

As one of the lighting systems, of this kind, Japanese Unexamined Patent Application Publication No. 2014-60078 discloses a lighting system including a plurality of lighting apparatuses each having a wireless device, a plurality of wireless terminals that communicate with the lighting apparatuses, and a management server that manages the lighting apparatuses. In this lighting system, adjacent ones of the lighting apparatuses can communicate with each other, and the plurality of lighting apparatuses form a mesh network.

SUMMARY

In the lighting system disclosed in Japanese Unexamined Patent Application Publication No. 2014-60078, a command for operating the lighting apparatuses is transmitted from the management server to each of the lighting apparatuses through a communication channel of the mesh network. Such transmission of the command through the communication channel of the mesh network makes it possible to operate the individual lighting apparatuses collectively in a similar manner.

However, when the individual lighting apparatuses are operated collectively in a similar manner, the lighting apparatuses may turn into an operating state that is unintended by others who are at work under a current operating state of the lighting apparatuses, thus adversely affecting a current operation in some cases. For example, in the case where the lighting apparatuses are collectively turned off even when there is a person at work with the lighting apparatuses lit up, there may be problems of interfering with the current work and causing user discomfort.

With the foregoing in mind, the present disclosure provides, for example, lighting apparatuses that suppress an adverse effect on a work being performed under a current operating state when the lighting apparatuses are collectively operated through a communication channel of a mesh network.

One aspect of a lighting apparatus according to the present disclosure is a lighting apparatus in a mesh network, the mesh network including the lighting apparatus and other lighting apparatuses. The lighting apparatus includes an apparatus communicator that wirelessly transmits and receives a command regarding an operation of the lighting apparatus; and an apparatus controller that has a first communication mode in which the lighting apparatus and a communication terminal mutually transmit and receive the command, and a second communication mode in which the lighting apparatus and one of the other lighting apparatuses mutually transmit and receive the command, the apparatus controller capable of executing the command received in the first communication mode and the command received in the second communication mode. When the apparatus communicator receives the command, which originates from a first communication terminal and affects the lighting apparatus and the other lighting apparatuses, via one of the other lighting apparatuses in the second communication mode, the apparatus controller executes the command received in the second communication mode if the apparatus controller is not in communication with a second communication terminal different from the first communication terminal in the first communication mode, and maintains a current operating state without executing the command received in the second communication mode if the apparatus controller is in communication with the second communication terminal in the first communication mode.

Furthermore, one aspect of a lighting system according to the present disclosure includes the plurality of lighting apparatuses.

It is possible to provide, for example, lighting apparatuses that suppress an adverse effect on a work being performed under a current operating state when the lighting apparatuses are collectively operated through a communication channel of a mesh network.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

In the following, lighting apparatuses and a lighting system according to embodiments will be described with reference to the accompanying drawings. It should be noted that each of the embodiments described below illustrates one specific example of the present disclosure. Thus, the numerical values, shapes, materials, structural components, the arrangement and connection of the structural components mentioned in the following embodiments are merely an example and not intended to limit the present disclosure. Accordingly, among the structural components in the following embodiments, the one that is not recited in any independent claim exhibiting the most generic concept of the present disclosure will be described as an arbitrary structural component.

Incidentally, each of the figures is a schematic view and not necessarily illustrated in a strict manner. Furthermore, in each of the figures, substantially the same structures are assigned the same reference signs, and the redundant description of such structures will be omitted or simplified.

Embodiment 1

Configuration of Lighting System and Lighting Apparatuses

Figure 1:
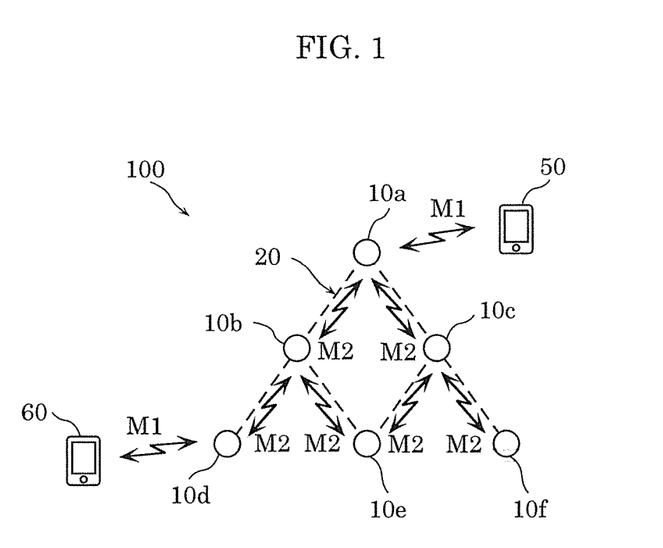
FIG. 1 illustrates a lighting system and a plurality of lighting apparatuses according to Embodiment 1 with an example of a mesh network formed by the plurality of lighting apparatuses.

FIG. 1 illustrates lighting system 100 and a plurality of lighting apparatuses 10a, 10b, 10c, 10d, 10e, and 10f according to Embodiment 1, with an example of mesh network 20 (indicated by broken lines in FIG. 1) formed by lighting apparatuses 10a to 10f.

Lighting system 100 includes a plurality of lighting apparatuses 10a to 10f having a communication function. In this lighting system 100, adjacent ones (for example, lighting apparatuses 10b and 10d) of the plurality of lighting apparatuses 10a to 10f communicate with each other so as to construct a wireless communication channel, thereby forming a mesh network. It should be noted that this mesh network 20 may be formed not necessarily between the adjacent lighting apparatuses but between the lighting apparatuses a predetermined number of hops away from each other within a wireless communication range.

Furthermore, lighting apparatuses 10a to 10f can communicate with communication terminals 50 and 60 (first communication terminal 50 and second communication terminal 60) operated respectively by a plurality of users. Communication terminals 50 and 60 are set to be automatically connected in a communicative manner to lighting apparatuses 10a to 10f located close to themselves. In FIG. 1, communication terminal 50 is communicatively connected to lighting apparatus 10a, and communication terminal 60 is communicatively connected to lighting apparatus 10d.

Figure 2:
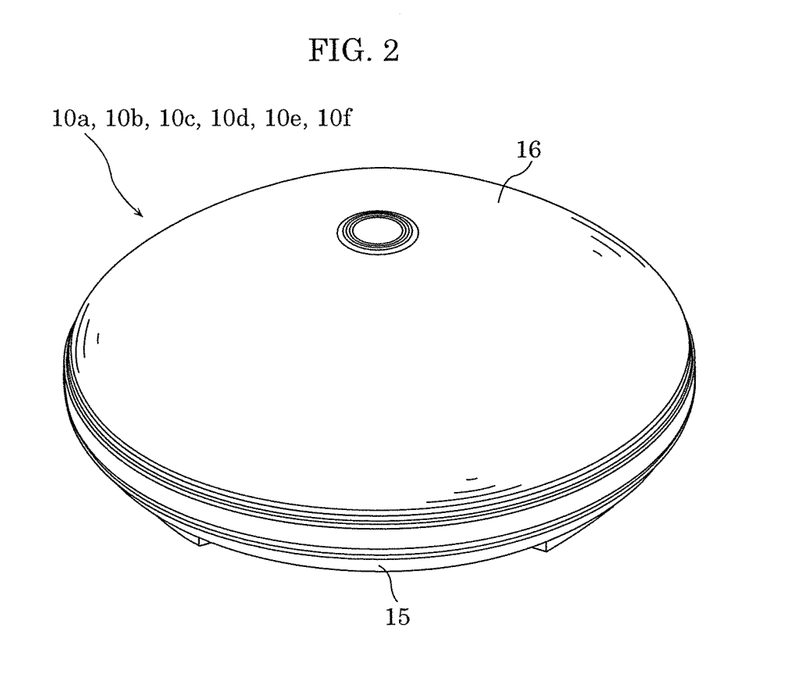
FIG. 2 illustrates an example of an external appearance of each of the lighting apparatuses according to Embodiment 1.
Figure 3:
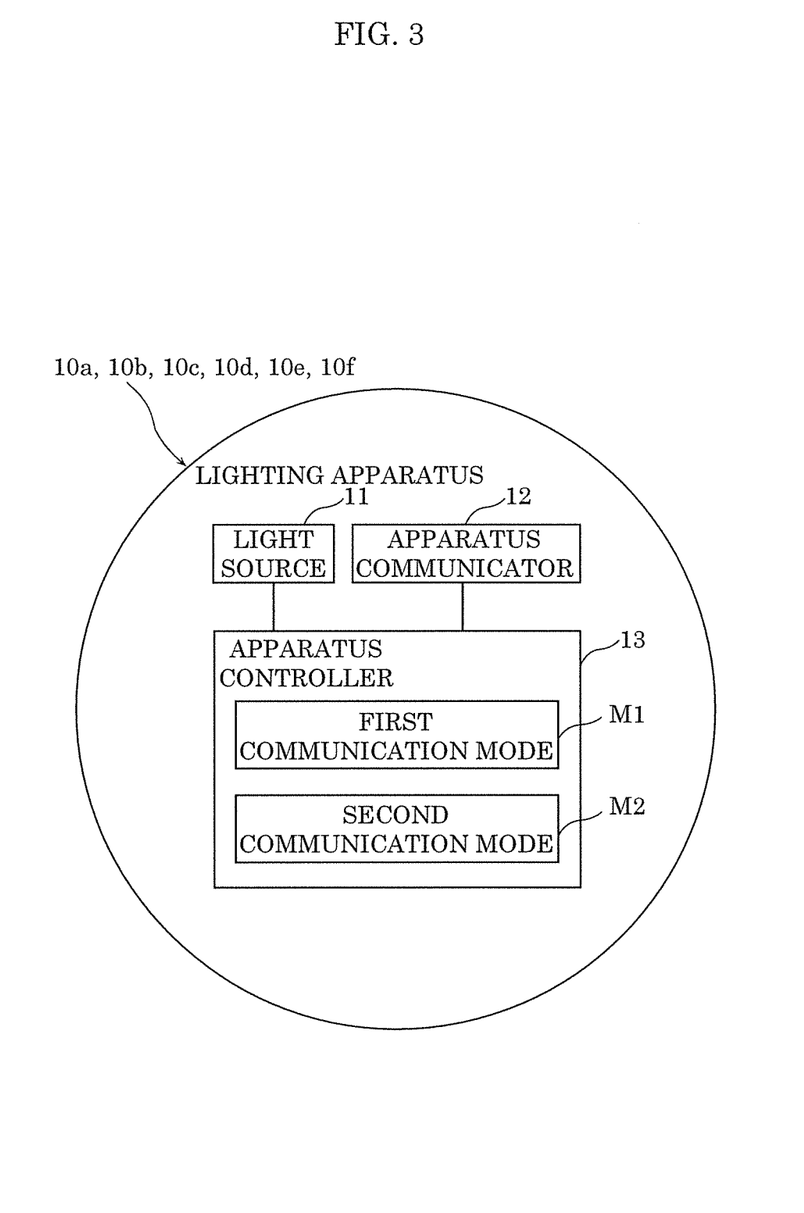
FIG. 3 is a block diagram illustrating a control configuration of each of the lighting apparatuses according to Embodiment 1.

FIG. 2 illustrates an example of an external appearance of each of lighting apparatuses 10a to 10f. FIG. 3 is a block diagram illustrating a control configuration of each of lighting apparatuses 10a to 10f.

Each of lighting apparatuses 10a to 10f is, for example, a ceiling light as illustrated in FIG. 2 and installed in a building material (a ceiling) of a house or the like. Lighting apparatuses 10a to 10f each include apparatus main body 15 and globe 16 that covers main body 15. Globe 16 is formed of a translucent resin material. As illustrated in FIG. 3, apparatus main body 15 includes light source 11, apparatus communicator 12, and apparatus controller 13.

Light source 11 includes a plurality of light-emitting diodes that emit white light, red light, green light, or blue light, for example. Apparatus controller 13 controls dimming and/or toning of light source 11.

Apparatus communicator 12 includes an antenna and a wireless communication circuit. Apparatus communicator 12 of one lighting apparatus wirelessly transmits a command regarding operations of lighting apparatuses 10a to 10f to and receives it from apparatus communicator 12 of another lighting apparatus. For example, lighting apparatus 10b can communicate with lighting apparatuses 10a, 10d, and 10e that are located adjacent to lighting apparatus 10b. Furthermore, apparatus communicator 12 of each of lighting apparatuses 10a to 10f can also communicate with communication terminal 50 or 60. The system of such communication can include a system of communicating in a 2.4 GHz frequency band such as Bluetooth (registered trademark) under IEEE 802.15.1 standards, for example.

Apparatus controller 13 includes a CPU, a RAM, and a ROM that stores a program. The CPU executes the program stored in RAM in order that apparatus controller 13 carries out the control and functions described herein. Apparatus controller 13 has a plurality of communication modes (first communication mode M1 and second communication mode M2) for communicating with other lighting apparatuses via apparatus communicator 12. First communication mode M1 is a communication mode in a case where each of lighting apparatuses 10a to 10f and communication terminal 50 or 60 mutually communicate. Second communication mode M2 is a communication mode in a case where a plurality of lighting apparatuses 10a to 10f forming mesh network 20 mutually transmit and receive the command. Apparatus controller 13 can transmit and receive the command using both of first communication mode M1 and second communication mode M2 at the same time. Apparatus controller 13 executes the command received in first communication mode M1 and the command received in second communication mode M2 according to conditions of use of lighting apparatuses 10a to 10f.

Figure 4:
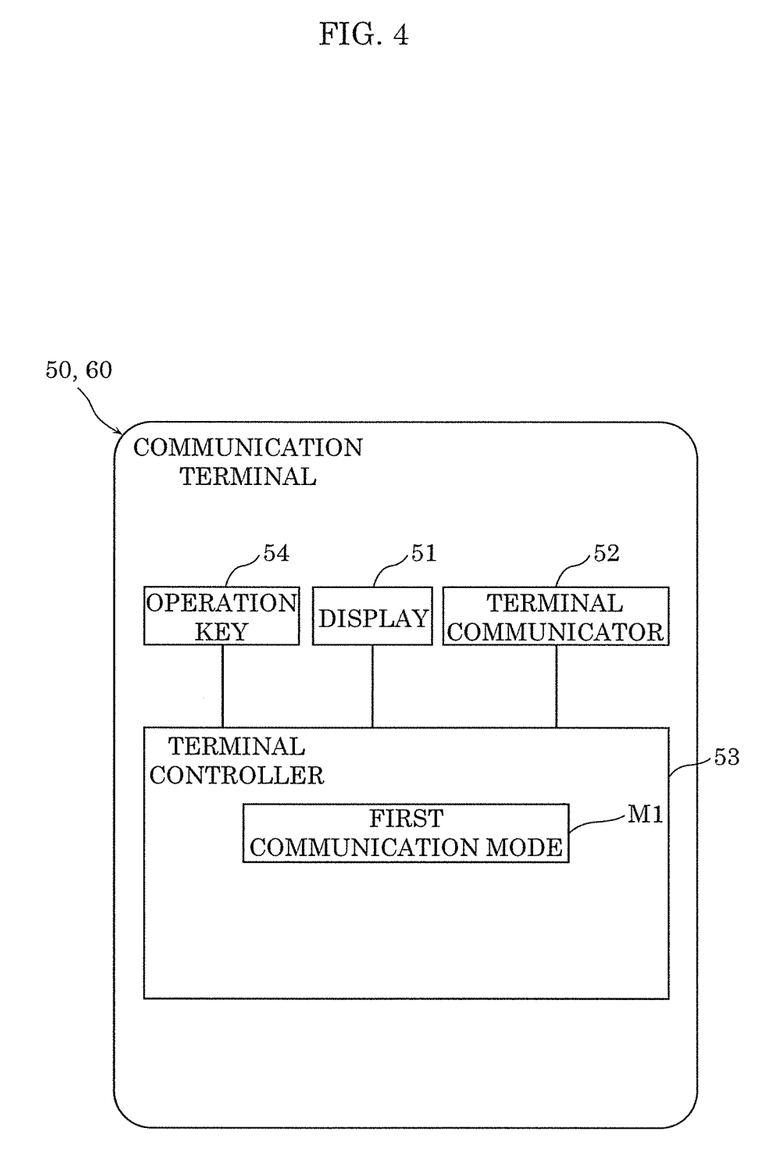
FIG. 4 is a block diagram illustrating a control configuration of a communication terminal that communicates with the lighting apparatuses according to Embodiment 1.

FIG. 4 is a block diagram illustrating a control configuration of each of communication terminals 50 and 60 that communicate with lighting apparatuses 10a to 10f.

Each of communication terminals 50 and 60 is, for example, a tablet terminal or a smartphone and includes operation key 54, display 51, terminal communicator 52, and terminal controller 53.

Operation key 54 is, for example, a touch panel for entering a command for operating lighting apparatuses 10a to 10f. Display 51 is, for example, a liquid crystal monitor for displaying an operating state of each of lighting apparatuses 10a to 10f and for displaying whether or not lighting apparatuses 10a to 10f join in mesh network 20. Terminal communicator 52 includes an antenna and a wireless communication circuit. Terminal controller 53 includes a CPU, a RAM, and a ROM. Terminal controller 53 executes a program stored in the ROM which causes the controller to carry out the functions and control described herein. Terminal controller 53 operates in first communication mode M1 for communicating with each of lighting apparatuses 10a to 10f.

The commands regarding the operations of lighting apparatuses 10a to 10f such as turning on, turning off, dimming, toning, and resetting are transmitted and received between communication terminals 50 and 60 and lighting apparatuses 10a to 10f in first communication mode M1 and among lighting apparatuses 10a to 10f in second communication mode M2, respectively. Furthermore, other than these commands, pieces of authentication information such as an address assigned to each of lighting apparatuses 10a to 10f and a network encryption key are transmitted and received between communication terminals 50 and 60 and lighting apparatuses 10a to 10f and among lighting apparatuses 10a to 10f.

For example, by transmitting the command regarding the operation of lighting apparatus 10b while designating the address, it is possible to operate lighting apparatus 10b alone. Moreover, by assigning the address to the plurality of lighting apparatuses 10a to 10f as one group, it is possible to collectively operate the one group consisting of lighting apparatuses 10a to 10f. Additionally, a predetermined one or all of the commands for turning on, turning off, dimming, toning, and resetting can be set in advance so that lighting apparatuses 10a to 10f are operated collectively.

In principle, these commands are transmitted in such a manner as to originate from communication terminal 50 or 60 and affect a plurality of lighting apparatuses 10a to 10f through communication channels of mesh network 20. For example, when a predetermined command is transmitted from communication terminal 50 to lighting apparatus 10a in first communication mode M1, lighting apparatus 10a transmits the received command to lighting apparatus 10b in second communication mode M2. Lighting apparatus 10b not only executes the received command but also transmits this command to lighting apparatuses 10d and 10e in second communication mode M2.

It should be noted however that, in the present embodiment, lighting apparatuses 10a to 10f that are in communication in first communication mode M1 are set to ignore and not to execute the command received from other lighting apparatuses. For example, lighting apparatus 10d that is in communication with communication terminal 60 in first communication mode M1 does not execute the command that has originated from communication terminal 50 and been received in second communication mode M2, and maintains a current operating state. Furthermore, although lighting apparatus 10a once accepts the command received in first communication mode M1, it does not execute the command but maintains the current operating state because it is in direct communication with communication terminal 50 in first communication mode M1.

In other words, in lighting apparatuses 10a to 10f according to the present embodiment, when lighting apparatuses 10a to 10f are to be operated collectively, it is considered that there are persons at work in a current operating state of the lighting apparatuses that are in communication in first communication mode M1 (for example, lighting apparatuses 10a and 10d), and thus this operating state is maintained. In this way, an adverse effect on the work is suppressed.

Operation of Lighting Apparatuses

Figure 5:
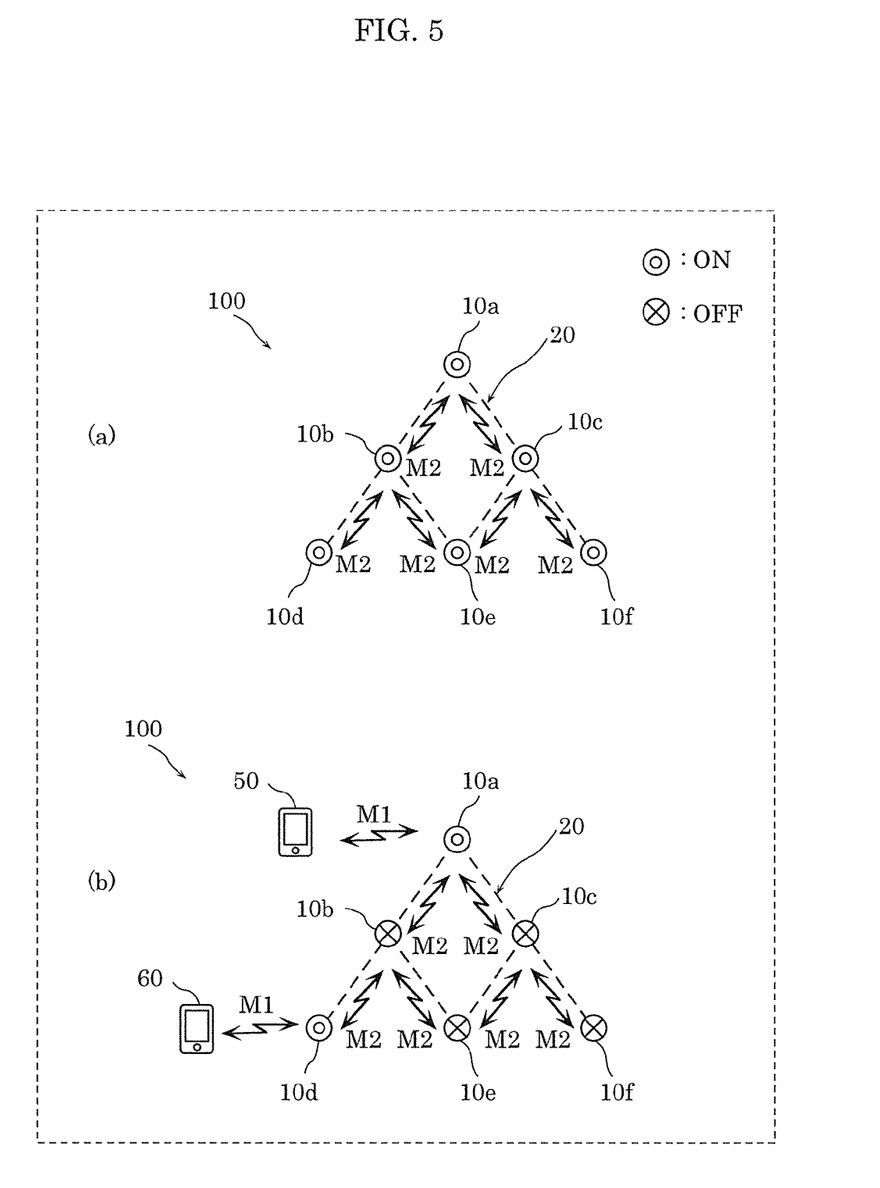
FIG. 5 illustrates lighting states of the lighting apparatuses in Embodiment 1, with (a) illustrating a state in which all of the lighting apparatuses forming the mesh network have been turned on and (b) illustrating a case where a turn-off command is supplied to the individual lighting apparatuses.
Figure 6:
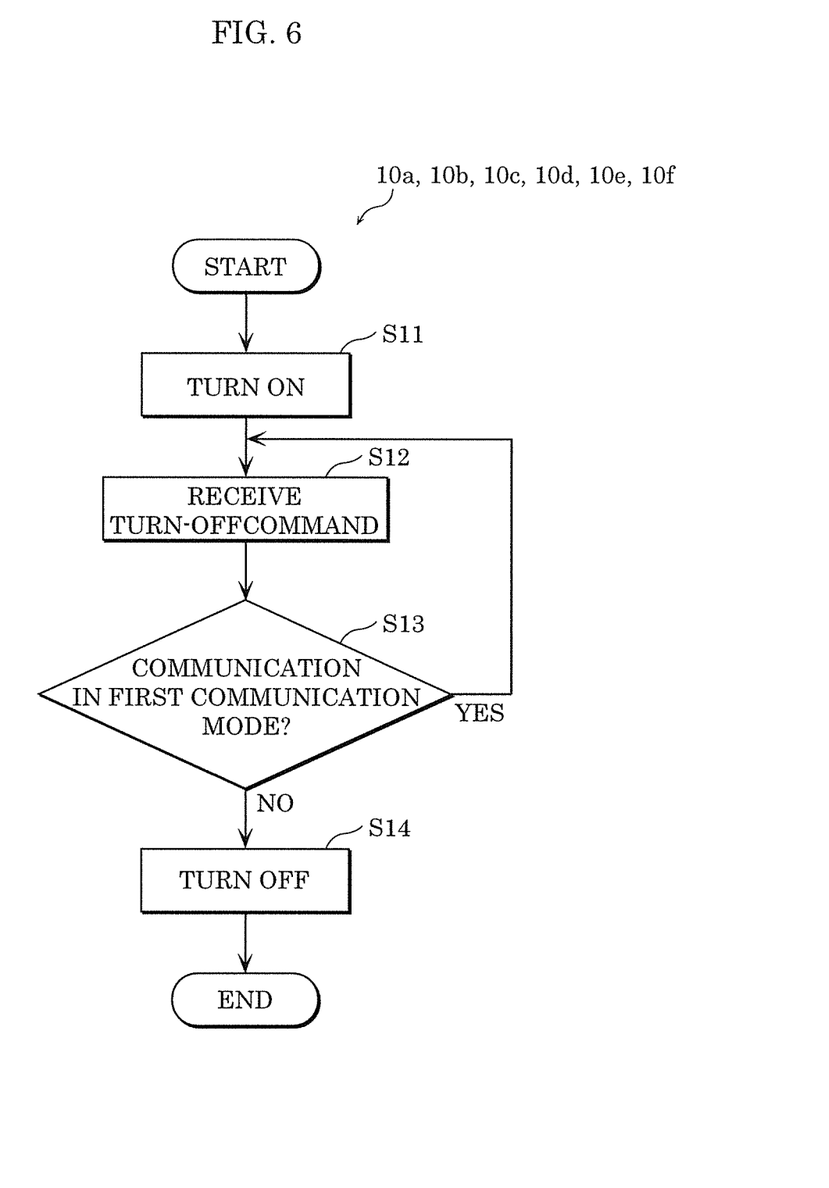
FIG. 6 is a flowchart for determining whether to turn on or off the lighting apparatuses in Embodiment 1.

Now, referring to FIG. 5 and FIG. 6, the following is a description of how a plurality of lighting apparatuses 10a to 10f forming mesh network 20 are operated when a turn-off command is supplied to lighting apparatuses 10a to 10f. Herein, the description will be directed to a case in which a person at work near lighting apparatus 10a turns off other lighting apparatuses 10b to 10f to save electricity.

FIG. 5 illustrates lighting states of lighting apparatuses 10a to 10f, and FIG. 6 is a flowchart for determining whether to turn on or off lighting apparatuses 10a to 10f.

At first, as illustrated in (a) of FIG. 5, all of the plurality of lighting apparatuses 10a to 10f forming mesh network 20 have been turned on (S11 in FIG. 6).

In this state, as illustrated in (b) of FIG. 5, a person at work near lighting apparatus 10a uses communication terminal 50 to transmit a turn-off command to lighting apparatus 10a for the purpose of turning off other lighting apparatuses 10b to 10f.

First, the operation of lighting apparatus 10a that has directly received the turn-off command from communication terminal 50 will be described with reference to FIG. 6.

Lighting apparatus 10a receives the turn-off command from communication terminal 50 in first communication mode M1 (S12 in FIG. 6). Thereafter, lighting apparatus 10a determines whether or not it is in communication with any communication terminal in first communication mode M1 (S13 in FIG. 6). At this time, lighting apparatus 10a once accepts the turn-off command received in first communication mode M1. However, since lighting apparatus 10a is in communication with communication terminal 50 in first communication mode M1 (Yes in S13), lighting apparatus 10a does not execute the turn-off command received in first communication mode M1 but maintains the current operating state. At the same time, lighting apparatus 10a transfers the turn-off command to lighting apparatuses 10b and 10c adjacent to lighting apparatus 10a in second communication mode M2. Incidentally, lighting apparatus 10a stays on until it receives another turn-off command.

Now, the operation of lighting apparatuses 10b to 10f that have received the turn-off command via a lighting apparatus different from themselves will be described also with reference to FIG. 6.

Lighting apparatuses 10b and 10c each receive the turn-off command from lighting apparatus 10a in second communication mode M2 (S12 in FIG. 6). Thereafter, lighting apparatuses 10b and 10c determine whether or not they are in communication with any communication terminal in first communication mode M1 (S13 in FIG. 6). At this time, lighting apparatuses 10b and 10c are not in communication with any communication terminal in first communication mode M1 (No in S13), and thus each execute the turn-off command received in second communication mode M2 (S14 in FIG. 6). At the same time, lighting apparatuses 10b and 10c transfer the turn-off commands to lighting apparatuses 10d, 10e, and 10f located adjacent to lighting apparatuses 10b and 10c in second communication mode M2.

Lighting apparatuses 10d, 10e, and 10f receive the turn-off commands from lighting apparatuses 10b and 10c in second communication mode M2 (S12 in FIG. 6). Thereafter, lighting apparatuses 10d, 10e, and 10f determine whether or not they are in communication with any communication terminal in first communication mode M1 (S13 in FIG. 6). At this time, lighting apparatuses 10e and 10f are not in communication with any communication terminal in first communication mode M1 (No in S13), and thus each execute the turn-off command received in second communication mode M2 (S14 in FIG. 6).

On the other hand, lighting apparatus 10d is in communication with communication terminal 60 in first communication mode M1 (Yes in S13), and thus ignores and does not execute the turn-off command received in second communication mode M2 so as to maintain the current operating state. Furthermore, lighting apparatus 10d also notifies communication terminal 50 of response information that the received turn-off command is not to be executed, by causing this response information to pop up. Communication terminal 50 is notified of this response information using second communication mode M2 used in the communication channels in mesh network 20 and first communication mode M1 used in the communication channel between lighting apparatus 10a and communication terminal 50.

In other words, in lighting apparatuses 10a to 10f according to the present embodiment, as illustrated in (b) of FIG. 5, even when a person at work near lighting apparatus 10a uses communication terminal 50 to supply a turn-off command to lighting apparatuses 10a to 10f collectively, lighting apparatuses 10a and 10d located near communication terminals 50 and 60 are set not to be turned off.

Summary

As described above, in lighting apparatuses 10a to 10f according to the present embodiment, when apparatus communicator 12 receives a command that originates from first communication terminal 50 and affects a plurality of lighting apparatuses 10a to 10f in second communication mode M2 via a lighting apparatus different from the lighting apparatus including this apparatus communicator 12, apparatus controller 13 executes the command received in second communication mode M2 if the lighting apparatus including this apparatus controller 13 is not in communication with second communication terminal 60 different from first communication terminal 50 in first communication mode M1, and maintains the current operating state without executing the command received in second communication mode M2 if the lighting apparatus including this apparatus controller 13 is in communication with second communication terminal 60 in first communication mode M1.

With this, in the case of collectively operating lighting apparatuses 10a to 10f using the communication channel of mesh network 20 with first communication terminal 50 serving as an originator, it is possible to suppress an adverse effect on a work under a lighting apparatus located near second communication terminal 60 (lighting apparatus 10d in (b) of FIG. 5).

In the present embodiment, the state of "being in communication in first communication mode M1" includes not only a period in which a command is transmitted and received in first communication mode M1 but also a session from when communication terminal 50 or 60 and lighting apparatuses 10a to 10f are connected in first communication mode M1 to when they are disconnected.

Furthermore, for example, when apparatus communicator 12 in lighting apparatus 10a receives a command that originates from first communication terminal 50 and affects a plurality of lighting apparatuses 10a to 10f from first communication terminal 50 in first communication mode M1, apparatus controller 13 may not only maintain the current operating state without executing the command received in first communication mode M1 but also transfer the command to lighting apparatuses 10b to 10f different from lighting apparatus 10a in second communication mode M2.

This makes it possible to both maintain the current operating state of lighting apparatus 10a located near first communication terminal 50 and collectively cause other lighting apparatuses 10b, 10c, 10e, and 10f to execute the command. Additionally, even when the command is accidentally supplied to lighting apparatus 10a, lighting apparatus 10a maintains the current operating state, so that an adverse effect on a current work under lighting apparatus 10a can be suppressed.

Moreover, if apparatus controller 13 does not execute the command received in second communication mode M2, apparatus controller 13 may notify first communication terminal 50 of the information that the command is not to be executed.

With this, the information of which first communication terminal 50 is notified provides a recognition that there is another lighting apparatus that may interfere with the current work if the command is executed and, thus, the command has not been executed in that lighting apparatus.

Furthermore, lighting system 100 according to the present embodiment includes a plurality of lighting apparatuses 10a to 10f.

With this lighting system 100, in the case of collectively operating lighting apparatuses 10a to 10f through the communication channel of mesh network 20 with communication terminal 50 serving as an originator, it is possible to suppress an adverse effect on a work under lighting apparatus 10d located near communication terminal 60.

Embodiment 2

Configuration of Lighting System and Lighting Apparatuses

In lighting system 100 according to Embodiment 2, lighting apparatuses 10a to 10f that have received a command directly from communication terminal 50 are set to follow that command.

For example, when apparatus communicator 12 in lighting apparatus 10a receives a command that originates from first communication terminal 50 and affects a plurality of lighting apparatuses 10a to 10f from first communication terminal 50 in first communication mode M1, apparatus controller 13 is configured not only to execute the command received in first communication mode M1 but also to transfer that command to lighting apparatuses 10b to 10f different from lighting apparatus 10a in second communication mode M2.

Operation of Lighting Apparatuses

Figure 7:
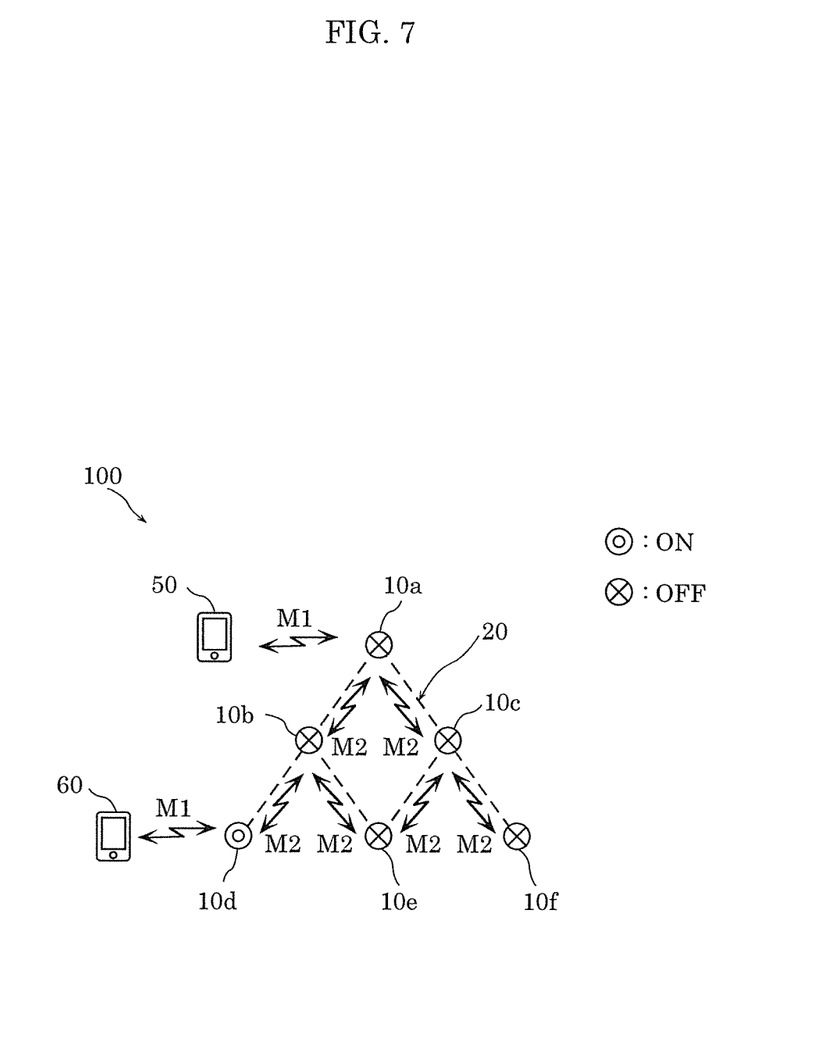
FIG. 7 illustrates lighting states of a plurality of lighting apparatuses in Embodiment 2, in a case where a turn-off command is supplied to the lighting apparatuses forming a mesh network.
Figure 8:
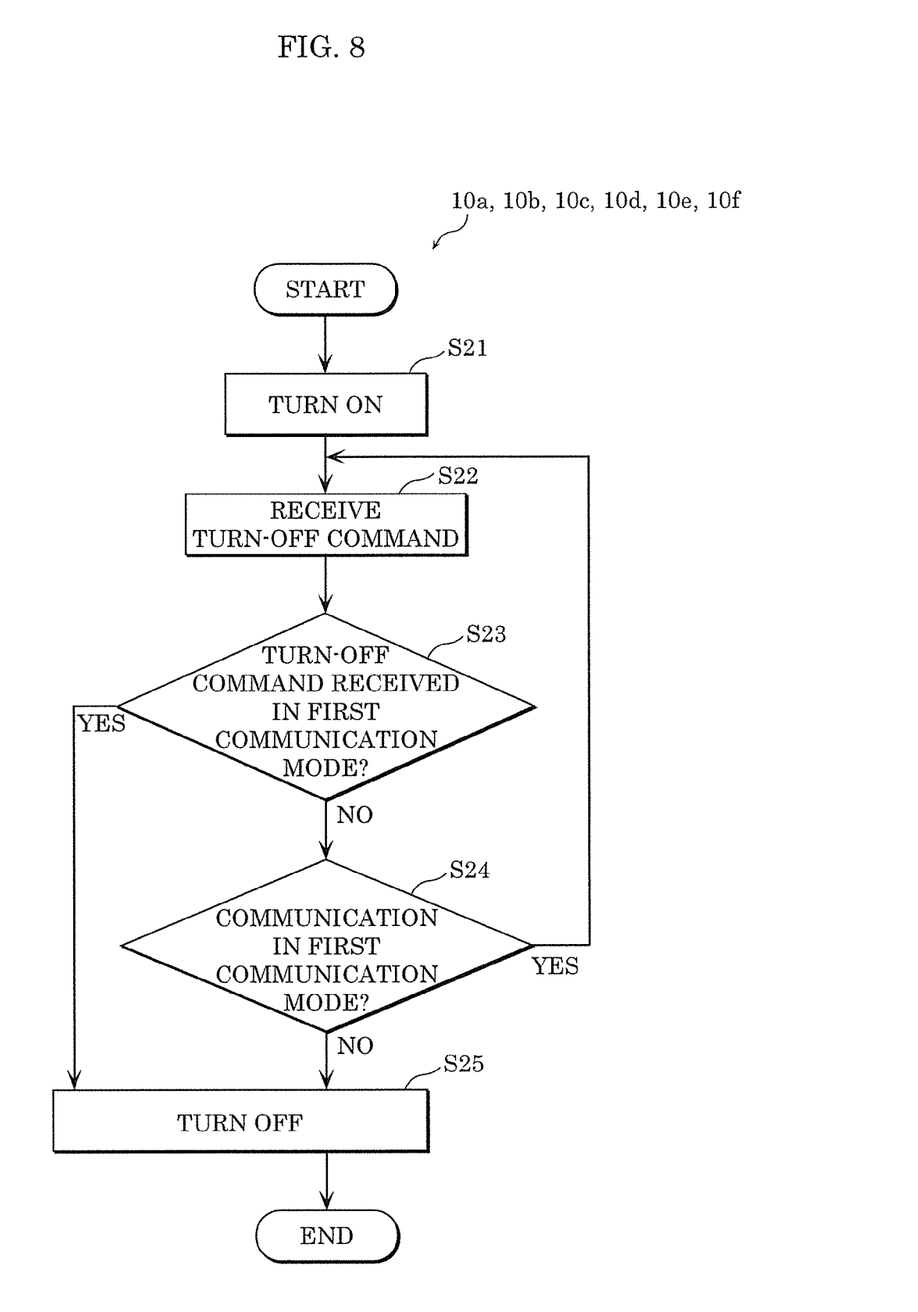
FIG. 8 is a flowchart for determining whether to turn on or off the lighting apparatuses in Embodiment 2.

Referring to FIG. 7 and FIG. 8, the following is a description of the operation of a plurality of lighting apparatuses 10a to 10f when a turn-off command is supplied to lighting apparatuses 10a to 10f. It should be noted that the description herein will be directed to a case in which a person who has been at work on a floor where lighting apparatuses 10a to 10f are installed finishes the work there and thus turns off all of lighting apparatuses 10a to 10f.

FIG. 7 illustrates lighting states of lighting apparatuses 10a to 10f, and FIG. 8 is a flowchart for determining whether to turn on or off lighting apparatuses 10a to 10f.

First, all of the plurality of lighting apparatuses 10a to 10f forming mesh network 20 have been turned on (S21 in FIG. 8).

In this state, as illustrated in FIG. 7, a person at work near lighting apparatus 10a uses communication terminal 50 to transmit a turn-off command to lighting apparatus 10a for the purpose of turning off all of lighting apparatuses 10a to 10f.

First, the operation of lighting apparatus 10a that has directly received the turn-off command from communication terminal 50 will be described with reference to FIG. 8.

Lighting apparatus 10a receives the turn-off command from communication terminal 50 in first communication mode M1 (S22 in FIG. 8). Thereafter, lighting apparatus 10a determines whether or not it is in communication with any communication terminal in first communication mode M1 (S23 in FIG. 8). At this time, lighting apparatus 10a is in communication with communication terminal 50 in first communication mode M1 (Yes in S23), and thus executes the turn-off command received in first communication mode M1 (S25 in FIG. 8). At the same time, lighting apparatus 10a transfers the turn-off command to lighting apparatuses 10b and 10c adjacent to itself in second communication mode M2.

Now, the operation of lighting apparatuses 10b to 10f that have received the turn-off command via a lighting apparatus different from themselves will be described also with reference to FIG. 8.

Lighting apparatuses 10b and 10c each receive the turn-off command from lighting apparatus 10a in second communication mode M2 (S22 in FIG. 8). Thereafter, lighting apparatuses 10b and 10c determine whether or not the turn-off command has been received in first communication mode M1 (S23 in FIG. 8). Lighting apparatuses 10b and 10c have not received the turn-off command in first communication mode M1 but received it in second communication mode M2. Thus, the operation proceeds to the next step, and lighting apparatuses 10b and 10c determine whether or not they are in communication with any communication terminal in first communication mode M1 (S24 in FIG. 8). At this time, lighting apparatuses 10b and 10c are not in communication with any communication terminal in first communication mode M1 (No in S24), and thus each execute the turn-off command received in second communication mode M2 (S25 in FIG. 8). At the same time, each of them transfers the turn-off command to lighting apparatuses 10d, 10e, and 10f adjacent to themselves in second communication mode M2.

Lighting apparatuses 10d, 10e, and 10f receive the turn-off command from lighting apparatuses 10b and 10c in second communication mode M2 (S22 in FIG. 8). Thereafter, lighting apparatuses 10d, 10e and 10f determine whether or not the turn-off command has been received in first communication mode M1 (S23 in FIG. 8). Lighting apparatuses 10d, 10e and 10f have received the turn-off command not in first communication mode M1 (No in S23) but in second communication mode M2. Thus, the operation proceeds to the next step, and lighting apparatuses 10d, 10e, and 10f determine whether or not they are in communication with any communication terminal in first communication mode M1 (S24 in FIG. 8).

At this time, lighting apparatuses 10e and 10f are not in communication with any communication terminal in first communication mode M1 (No in S24), and thus each execute the turn-off command received in second communication mode M2 (S25 in FIG. 8).

On the other hand, lighting apparatus 10d is in communication with communication terminal 60 in first communication mode M1 (Yes in S24), and thus ignores and does not execute the turn-off command received in second communication mode M2 so as to maintain the current operating state. Furthermore, lighting apparatus 10d also notifies communication terminal 50 of response information that the received turn-off command is not to be executed, by causing this response information to pop up.

In other words, in lighting apparatuses 10a to 10f according to the present embodiment, as illustrated in FIG. 7, even when a person at work near lighting apparatus 10a uses communication terminal 50 to supply a turn-off command to lighting apparatuses 10a to 10f collectively, lighting apparatus 10d located near communication terminal 60 is set not to be turned off.

Summary

As described above, also in lighting apparatuses 10a to 10f according to the present embodiment, when apparatus communicator 12 receives a command that originates from first communication terminal 50 in second communication mode M2 via a lighting apparatus different from the lighting apparatus including this apparatus communicator 12, apparatus controller 13 executes the command received in second communication mode M2 if the lighting apparatus including this apparatus controller 13 is not in communication with second communication terminal 60 in first communication mode M1, and maintains the current operating state without executing the command received in second communication mode M2 if the lighting apparatus including this apparatus controller 13 is in communication with second communication terminal 60 in first communication mode M1.

With this, in the case of collectively operating lighting apparatuses 10a to 10f through the communication channel of mesh network 20 with first communication terminal 50 serving as an originator, it is possible to suppress an adverse effect on a work under a lighting apparatus located near second communication terminal 60 (lighting apparatus 10d in FIG. 7).

Furthermore, for example, when apparatus communicator 12 in lighting apparatus 10a receives a command that originates from first communication terminal 50 and affects a plurality of lighting apparatuses 10a to 10f from first communication terminal 50 in first communication mode M1, apparatus controller 13 of lighting apparatus 10a may not only execute the command received in first communication mode M1 but also transfer the command to lighting apparatuses 10b to 10f different from lighting apparatus 10a in second communication mode M2.

This makes it possible to collectively cause lighting apparatus 10a located near first communication terminal 50 as well as other lighting apparatuses 10b, 10c, 10e, and 10f (except lighting apparatus 10d illustrated in FIG. 7) to execute the command.

Furthermore, lighting system 100 according to the present embodiment includes a plurality of lighting apparatuses 10a to 10f.

With this lighting system 100, in the case of collectively operating lighting apparatuses 10a to 10f through the communication channel of mesh network 20 with communication terminal 50 serving as an originator, it is possible to suppress an adverse effect on a work under lighting apparatus 10d located near communication terminal 60.

The above description has been directed to embodiments of lighting apparatuses 10a to 10f and lighting system 100. However, the present disclosure is not limited to the above embodiments. For example, the present disclosure covers a mode obtained by making various modifications conceived by a person skilled in the art to the embodiments described above and a mode achieved by any combinations of the structural components and the functions in the embodiments as long as not departing from the purport of the present disclosure.

Although lighting apparatuses 10a to 10f are operated by the command from communication terminal 50 in Embodiment 1, for example, there is no particular limitation to this. Lighting apparatuses 10a to 10f may be operated by a command from communication terminal 60 in first communication mode M1. Furthermore, a management server that manages lighting apparatuses 10a to 10f may be provided in lighting system 100, and lighting apparatuses 10a to 10f may be operated by a command from the management server using the first communication mode.

Moreover, although lighting apparatus 10d and communication terminal 60 are communicatively connected to each other in Embodiments 1 and 2, there is no particular limitation to this. It may also be possible to provide a roaming function in communication terminal 60 and allow communication terminal 60 that has been moved and other lighting apparatuses 10b, 10c, 10e, and 10f to be communicatively connected to each other in first communication mode M1. Additionally, the communicative connection is not necessarily achieved automatically but may be achieved by manually operating communication terminals 50 and 60.

Furthermore, although the description has been directed to an example of a short-distance wireless communication system using Bluetooth (registered trademark) in Embodiment 1, there is no particular limitation to this. It is also possible to employ communication systems such as WiFi (registered trademark), infrared communication, Wi-SUN (registered trademark), or Zigbee.

In addition, although the description has been directed to an example in which the ceiling light is used as lighting apparatuses 10a to 10f in Embodiment 1, there is no particular limitation to this. A light-emitting diode (LED) base light or an LED downlight may also be used, or other types of lighting without departing from the intended scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus in a mesh network, the mesh network including the lighting apparatus and other lighting apparatuses, the lighting apparatus comprising:
   an apparatus communicator that wirelessly transmits and receives a command regarding an operation of the lighting apparatus; and
   an apparatus controller that has a first communication mode in which the lighting apparatus and a communication terminal mutually transmit and receive the command, and a second communication mode in which the lighting apparatus and one of the other lighting apparatuses mutually transmit and receive the command, the apparatus controller capable of executing the command received in the first communication mode and the command received in the second communication mode,
   wherein when the apparatus communicator receives the command, which originates from a first communication terminal and affects the lighting apparatus and the other lighting apparatuses, via one of the other lighting apparatuses in the second communication mode:
   the apparatus controller executes the command received in the second communication mode if the apparatus controller is not in communication with a second communication terminal different from the first communication terminal in the first communication mode, and maintains a current operating state without executing the command received in the second communication mode if the apparatus controller is in communication with the second communication terminal in the first communication mode.

2. The lighting apparatus according to claim 1,
   wherein when the apparatus communicator receives the command, which originates from the first communication terminal and affects the lighting apparatus and the other lighting apparatuses, from the first communication terminal in the first communication mode:
   the apparatus controller maintains the current operating state without executing the command received in the first communication mode, and transfers the command to one of the other lighting apparatuses in the second communication mode.

3. The lighting apparatus according to claim 1,
   wherein when the apparatus communicator receives the command, which originates from the first communication terminal and affects the lighting apparatus and the other lighting apparatuses, from the first communication terminal in the first communication mode:
   the apparatus controller executes the command received in the first communication mode, and transfers the command to one of the plurality of the lighting apparatuses other than the lighting apparatus in the second communication mode.

4. The lighting apparatus according to claim 1,
   wherein when the apparatus controller does not execute the command received in the second communication mode, the apparatus controller notifies the first communication terminal of information that the command is not to be executed.

5. The lighting apparatus according to claim 1,
   wherein the command is a turn-off command for turning off the lighting apparatus.

6. A lighting system comprising:
   a lighting apparatus and other lighting apparatuses in a mesh network, each of the lighting apparatus and the other lighting apparatuses comprising:
   an apparatus communicator that wirelessly transmits and receives a command regarding an operation of the lighting apparatus; and
   an apparatus controller that has a first communication mode in which the lighting apparatus and a communication terminal mutually transmit and receive the command, and a second communication mode in which the lighting apparatus and one of the other lighting apparatuses mutually transmit and receive the command, the apparatus controller capable of executing the command received in the first communication mode and the command received in the second communication mode,
   wherein when the apparatus communicator receives the command, which originates from a first communication terminal and affects the lighting apparatus and the other lighting apparatuses, via one of the other lighting apparatuses in the second communication mode:
   the apparatus controller executes the command received in the second communication mode if the apparatus controller is not in communication with a second communication terminal different from the first communication terminal in the first communication mode, and maintains a current operating state without executing the command received in the second communication mode if the apparatus controller is in communication with the second communication terminal in the first communication mode.

7. The lighting system according to claim 6,
   wherein when the apparatus communicator receives the command, which originates from the first communication terminal and affects the lighting apparatus and the other lighting apparatuses, from the first communication terminal in the first communication mode:
   the apparatus controller maintains the current operating state without executing the command received in the first communication mode, and transfers the command to one of the other lighting apparatuses in the second communication mode.

8. The lighting system according to claim 6,
   wherein when the apparatus communicator receives the command, which originates from the first communication terminal and affects the lighting apparatus and the other lighting apparatuses, from the first communication terminal in the first communication mode:
   the apparatus controller executes the command received in the first communication mode, and transfers the command to one of the plurality of the lighting apparatuses other than the lighting apparatus in the second communication mode.

9. The lighting system according to claim 6,
wherein when the apparatus controller does not execute the command received in the second communication mode, the apparatus controller notifies the first communication terminal of information that the command is not to be executed.

10. The lighting system according to claim 6,
wherein the command is a turn-off command for turning off the lighting apparatus and the other lighting apparatuses.

11. A method of performing control in a lighting apparatus in a mesh network including the lighting apparatus and other lighting apparatuses, the lighting apparatus having a first communication mode in which the lighting apparatus and a communication terminal mutually transmit and receive a command, and a second communication mode in which the lighting apparatus and one of the other lighting apparatuses mutually transmit and receive the command, and the lighting apparatus capable of executing the command received in the first communication mode and the command received in the second communication mode, the method comprising:

when the lighting apparatus receives the command, which originates from a first communication terminal and affects the lighting apparatus and the other lighting apparatuses, via one of the other lighting apparatuses in the second communication mode:

executing the command received in the second communication mode if the lighting apparatus is not in communication with a second communication terminal different from the first communication terminal in the first communication mode, and maintaining a current operating state without executing the command received in the second communication mode if the lighting apparatus is in communication with the second communication terminal in the first communication mode.

12. The method according to claim 11,
wherein when the lighting apparatus receives the command, which originates from the first communication terminal and affects the lighting apparatus and the other lighting apparatuses, from the first communication terminal in the first communication mode:
maintaining the current operating state without executing the command received in the first communication mode, and transferring the command to one of the other lighting apparatuses in the second communication mode.

13. The method according to claim 11,
wherein when the lighting apparatus receives the command, which originates from the first communication terminal and affects the lighting apparatus and the other lighting apparatuses, from the first communication terminal in the first communication mode:
executing the command received in the first communication mode, and transferring the command to one of the plurality of the lighting apparatuses other than the lighting apparatus in the second communication mode.

14. The method according to claim 11,
wherein when the lighting apparatus does not execute the command received in the second communication mode, the lighting apparatus notifies the first communication terminal of information that the command is not to be executed.

15. The method according to claim 11,
wherein the command is a turn-off command for turning off the lighting apparatus and the other lighting apparatuses.

* * * * *